(12) United States Patent
Cho et al.

(10) Patent No.: US 6,236,813 B1
(45) Date of Patent: May 22, 2001

(54) REAL IMAGE TYPE FINDER

(75) Inventors: Michio Cho; Takashi Tanaka, both of Saitama (JP)

(73) Assignees: Fuji Photo Film Co., Ltd., Kanagawa; Fuji Photo Optical Co., Ltd., Saitama, both of (JP)

( * ) Notice: Subject to any disclaimer, the term of this patent is extended or adjusted under 35 U.S.C. 154(b) by 0 days.

(21) Appl. No.: 09/159,231

(22) Filed: Sep. 23, 1998

(30) Foreign Application Priority Data

Sep. 30, 1997 (JP) .................................................. 9-265506

(51) Int. Cl.[7] .................................................. G03B 13/06
(52) U.S. Cl. .......................... 396/382; 396/386; 359/643
(58) Field of Search ................... 396/72, 79, 84, 396/373, 378, 379, 382, 384, 385, 386; 359/362, 421, 422, 431, 432, 642, 643, 676, 678, 708, 726, 754, 771

(56) References Cited

U.S. PATENT DOCUMENTS

| | | | | |
|---|---|---|---|---|
| 4,751,539 | * | 6/1988 | Yamada et al. | 396/379 |
| 4,842,395 | | 6/1989 | Sato et al. | 350/519 |
| 4,947,198 | * | 8/1990 | Inanobe et al. | 396/384 |
| 5,034,764 | | 7/1991 | Inabata | 396/386 |
| 5,132,838 | * | 7/1992 | Ohshita | 359/432 |
| 5,270,758 | * | 12/1993 | Morooka | 396/386 |
| 5,563,736 | * | 10/1996 | Lewis | 359/432 |
| 5,625,486 | * | 4/1997 | Mori et al. | 359/431 |
| 5,689,373 | * | 11/1997 | Takato | 359/646 |
| 5,796,518 | * | 8/1998 | Kato | 359/432 |

FOREIGN PATENT DOCUMENTS

| | | | |
|---|---|---|---|
| 4-19705 | 1/1992 | (JP) | G02B/13/18 |
| 7-159865 | 6/1995 | (JP) | G03B/13/12 |
| 2538525 | 7/1996 | (JP) | G03B/13/12 |

* cited by examiner

Primary Examiner—David M. Gray
(74) Attorney, Agent, or Firm—Sughrue, Mion, Zinn, Macpeak & Seas, PLLC

(57) ABSTRACT

A real image finder comprises an objective lens system including a convex lens and having a positive power as a whole, an erect image prism having four reflection surfaces and inverting an inverted image of an object formed through the objective lens system in horizontal and vertical directions, and an eyepiece having a positive power, wherein the erect image prism and the eyepiece lens is integrated by forming an eyepiece surface on the image side of the erect image prism. To provide a fixed magnification finder, the objective lens system consists of a single lens having a positive power and at least one aspherical surface. To provide a zoom finder, the objective lens system comprises a first lens with a negative power and a second lens with a positive power arranged in this order from the object side. The second lens is moved along the optical axis for zooming.

4 Claims, 9 Drawing Sheets

SPHERICAL
ABERRATION

FIG. 2B

ASTIGMATISM

FIG. 2C

DISTORTION

FIG. 3A   FIG. 3B   FIG. 3C

SPHERICAL ABERRATION   ASTIGMATISM   DISTORTION

FIG. 4A   FIG. 4B   FIG. 4C

SPHERICAL ABERRATION   ASTIGMATISM   DISTORTION

FIG. 5A 
SPHERICAL ABERRATION

FIG. 5B 
ASTIGMATISM

FIG. 5C 
DISTORTION

SPHERICAL ABERRATION   ASTIGMATISM   DISTORTION

FIG. 8A  FIG. 8B  FIG. 8C

SPHERICAL ABERRATION   ASTIGMATISM   DISTORTION

SPHERICAL ABERRATION   ASTIGMATISM   DISTORTION

SPHERICAL
ABERRATION

ASTIGMATISM

DISTORTION

FIG. 13A   FIG. 13B   FIG. 13C

SPHERICAL
ABERRATION

ASTIGMATISM

DISTORTION

FIG. 14A     FIG. 14B     FIG. 14C

SPHERICAL
ABERRATION

ASTIGMATISM

DISTORTION

FIG. 15A     FIG. 15B     FIG. 15C

SPHERICAL
ABERRATION

ASTIGMATISM

DISTORTION

FIG. 16A  FIG. 16B  FIG. 16C

SPHERICAL
ABERRATION

ASTIGMATISM

DISTORTION

FIG. 17A  FIG. 17B  FIG. 17C

SPHERICAL
ABERRATION

ASTIGMATISM

DISTORTION

REAL IMAGE TYPE FINDER

BACKGROUND OF THE INVENTION

1. Field of the Invention

The present invention relates to a real image finder of a camera.

2. Background Arts

A real image finder is usually composed of an objective lens, a field lens, an erect image optical system and an eyepiece. For example, Japanese Patent No. 2538525 discloses a zoom finder that is composed of an objective lens system consisting of a concave lens and a convex lens, a field lens, an erect image prism and an eyepiece, arranged in this order from the object side. Japanese Laid-open Patent application No. 7-159865 discloses a zoom finder that is composed of an objective lens system consisting of a concave lens and a convex lens, a prism integrally formed with a convex lens, an erect image prism and an eyepiece, arranged in this order from the object side. Japanese Laid-open Patent application No. 4-19705 discloses three embodiments of fixed magnification finders. The first embodiment is composed of an objective lens, a prism with a first reflection surface, and a prism with second to fourth reflection surfaces that functions as an eyepiece, which are arranged in this order from the object side. The second embodiment is composed of an objective lens, a prism with first and second reflection surfaces, and a prism with third and fourth reflection surfaces that functions as an eyepiece, which are arranged in this order from the object side. The third embodiment uses a reflection mirror in addition to an objective lens and two prisms.

As seen from the above examples, conventional real image type finders need at least four elements to be a zooming finder, or at least three elements for a fixed magnification. As the number of elements increases, the manufacturing cost of the finder increases. As the number of elements' surfaces and air gaps increases with the number of elements, the formed image gets dark because of the surface reflection.

OBJECT OF THE INVENTION

In view of the foregoing, a prime object of the present invention is to provide a real image finder that uses a smaller number of elements and thus forms a clearer and brighter image.

DETAILED DESCRIPTION OF THE INVENTION

To achieve the above object, the present invention provides a real image type finder that comprises an objective lens system including at least a convex lens and having a positive power as a whole, an erect image prism having four reflection surfaces and inverting an inverted image of an object formed through the objective lens system in horizontal and vertical directions, and an eyepiece having a positive power, the erect image prism and the eyepiece lens being integrated by forming an eyepiece surface on the image side of the erect image prism.

Since the eyepiece, which has conventionally been a separate element, is integrated into the erect image prism, the number of elements is reduced. Because the number of elements' surfaces is reduced, the loss in the light intensity is reduced, so that the finder of the present invention forms a brighter image.

It is general to dispose a field lens on the object side of the erect image prism, for effectively conducting light bundles from the objective lens to the eyepiece. Therefore, it is preferable to integrate a field lens with the erect image prism by forming a field lens surface on the object side of the erect image prism. Thereby, the light from the objective lens is effectively conducted to the eyepiece without increasing the number of necessary elements.

It is also possible to form most of the image side surface of the objective lens system as a field lens surface so that the objective lens system doubles as a field lens. Thereby the erect image prism may have a flat surface on the object side thereof, on which it is possible to print a parallax correction mark. In that case, the objective lens system with the field lens surface is preferably a double-convex lens whose object side surface, i.e. the field lens surface, has a larger radius of curvature than its image side surface.

The real image finder of the present invention preferably satisfies the following condition:

$$-0.01<\{(1-N_p)/R_e\}-(N_p/T_p)<0 \tag{1}$$

wherein Re is the paraxial radius of curvature of the eyepiece surface, Np is the refractive index of the erect image prism, and Tp is the axial thickness of the erect image prism.

Above the upper limit of the condition (1), the diopter would be shifted to the plus side where the image plane of the objective lens system is located on the object side of the erect image prism. Below the lower limit of the condition (1), on the other hand, the diopter would be shifted too much to the minus side. To prevent the diopter from increasing, the image plane of the objective lens system must be located away from the erect image prism. As a result, in order to obtain a sufficiently large magnification, the total length of the finder would be elongated.

Forming the eyepiece surface integrally with the erect image prism lens results in increasing astigmatism and coma aberration. However, astigmatism and coma aberration can be compensated for by forming the eyepiece surface to be aspherical. In that case, the real image finder of the present invention should preferably satisfy the following conditions:

$$0<\Delta Z-R_e \cdot [1-\sqrt{1-(4/R_e^2)}]<0.01 \tag{2}$$

wherein Re is the paraxial radius of curvature of the eyepiece surface, and ΔZ is the sag value at the height of 2 mm from the optical axis.

Above the upper limit of the condition (2), spherical aberration would be over-compensated, though astigmatism and coma aberration would be compensated for very well. Below the lower limit of the condition (2), the compensating effect of the aspherical surface would not be expected.

When the present invention is applied to a fixed magnification finder, the objective lens system preferably consists of a single lens having a positive power and at least one aspherical surface. Thereby, aberrations are maintained in better balance even while the objective lens system consists of a single lens. Especially in the case where the objective lens system doubles as a field lens and the erect image prism has a flat object side surface, if the single objective lens does not have at least one aspherical surface, aberrations become so large that it is impossible to use the single lens as the objective lens system.

For a zoom finder, the objective lens system may be composed of a first or forward lens with a negative power and a second or rearward lens with a positive power arranged in this order from the object side, such that the second lens is movable along the optical axis for zooming.

Thereby the zoom finder can be composed of a smallest possible number of elements. According to this configuration, the change in diopter during the zooming would be more reduced if the first lens is also moved by a small amount during the zooming. On the contrary, where the objective lens system is composed of a first lens with a positive power and a second lens with a negative power, the field lens must have such a strong positive power that it is difficult to form the field lens integrally with the erect image prism. Where the second lens has a negative power, it is impossible to make the objective lens system function as the field lens.

BRIEF DESCRIPTION OF THE DRAWINGS

The present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

In the drawings, curves S show the astigmatism to the sagittal image surface, and curves M show the astigmatism to the meridional image surface.

DETAILED DESCRIPTION OF THE PREFERRED EMBODIMENT

EXAMPLE 1

Figure 1:
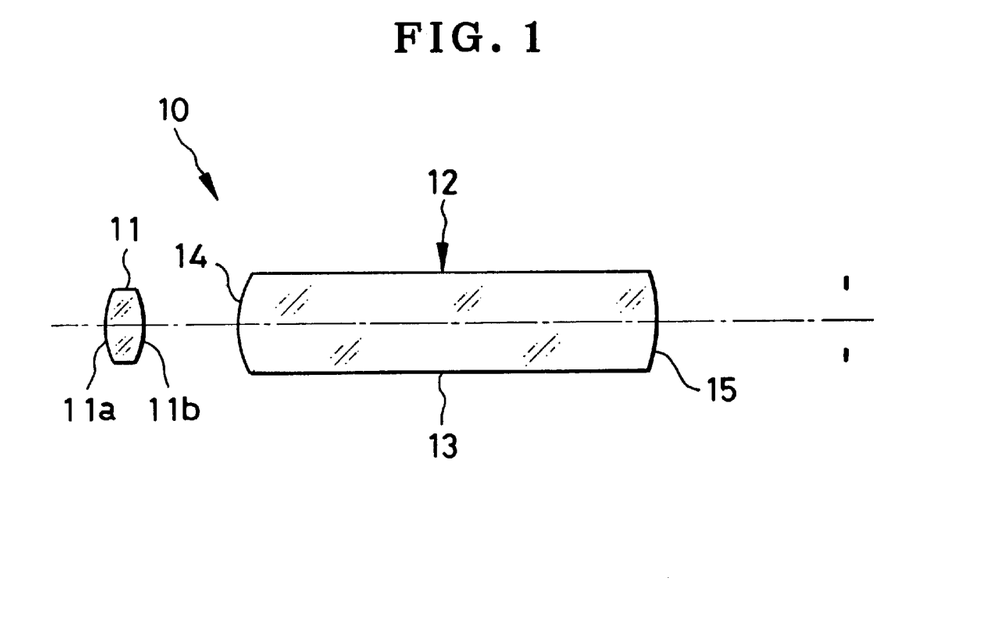
FIG. 1 is a schematic diagram showing a finder according to Example 1 of the present invention.

The finder 10 of the first Example of the present invention, as shown in FIG. 1, is composed of an objective lens 11 with a positive power, and an eyepiece block 12, arranged in this order from the object side. The objective lens 11 is a convex lens whose surfaces 11a and 11b are aspherical. The eyepiece block 12 consists of an erect image prism 13, a field lens and an eyepiece lens which are formed as an integral part, wherein a field lens surface 14 and an eyepiece lens surface 15 are formed on the object side and the image side of the erect image prism 13 respectively. The erect image prism 13 has four reflection surfaces, so that an inverted image formed through the objective lens 11 is inverted vertically and horizontally. The eyepiece lens surface 15 has a positive power and is aspherical. The erect image prism 13 may be a first type Porro prism, a second type Porro prism, or a prism with four reflection surfaces including a roof reflection surface. The finder 10 is designed to have a fixed magnification M of 0.34.

Numerical values for the first Example will be described below.

In the numerical values that follow, R is the radius of curvature of the respective surfaces of the finder elements 11 and 12, i is the surface number in the order from the object side, D is the spacing between two adjacent surfaces, N the refractive index, and ν the Abbe number.

EXAMPLE 1

| i | R(mm) | D(mm) | N | ν |
|---|---|---|---|---|
| 1 | 10.13125(aspherical) | 3.380 | 1.492 | 57.50 |
| 2 | −6.93385(aspherical) | 8.628 | | |
| 3 | 11.00958 | 38.773 | 1.492 | 57.50 |
| 4 | −13.48661(aspherical) | | | |

The aspherical surfaces satisfy the following definition:

$$Z=(H^2/R)/[1+\sqrt{1-(1+K)\cdot(H^2/R^2)}]+AH^2+BH^6+CH^8+DH^{10} \quad (3)$$

wherein Z is the shift amount in the direction of the optical axis, H is the height from the optical axis, R is the paraxial radius of curvature, A, B, C and D are the coefficients of the aspherical surfaces. It is possible to use another definition on the aspherical surfaces in place of the above definition (3) without interring the inventive effect.

Aspherical coefficients of the first Example are as follows:

| i | 1 | 2 | 4 |
|---|---|---|---|
| K | 0.5617 | −2.2695 | 2.4889 |
| A | 0.86747E-3 | 0.37127E-3 | 0.22383E-3 |
| B | −0.40343E-4 | 0.70903E-4 | −0.89812E-6 |

-continued

| i | 1 | 2 | 4 |
|---|---|---|---|
| C | −0.11337E-4 | −0.24950E-5 | −0.52755E-7 |
| D | 0.25876E-6 | −0.45100E-6 | 0.19581E-7 |

In the first Example, the first characteristic value of the invention $\{(1-Np)/Re\}-(Np/Tp)$ is equal to −0.002, wherein Re is the paraxial radius of curvature of the eyepiece surface 15, Np is the refractive index of the erect image prism 13, and Tp is the axial thickness of the erect image prism 13. Therefore the first Example satisfies the condition (1) for the first characteristic value of the invention: $-0.01<\{(1-Np)/Re\}-(Np/Tp)<0$.

In the first Example, the second characteristic value of the invention $\Delta Z-Re\cdot[1-\sqrt{1-(4/Re^2)}]$ is equal to 0.00140, wherein Re is the paraxial radius of curvature of the eyepiece surface 15, and $\Delta Z$ is the sag value at the height of 2 mm from the optical axis. Therefore, the first Example satisfies the condition (2) for the second characteristic value of the present invention: $0<\Delta Z-Re\cdot[1-\sqrt{1-(4/Re^2)}]<0.01$.

Figure 2A:
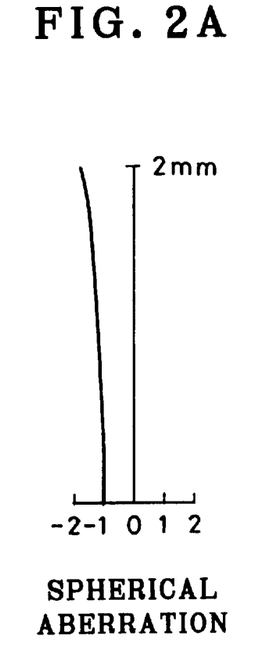
FIGS. 2A, 2B and 2C are diagrams showing aberration curves of the finder according to Example 1.
Figure 2B:
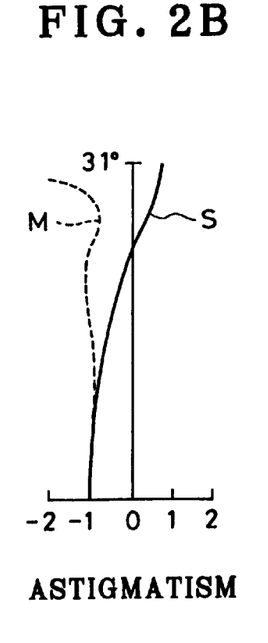
Figure 2C:
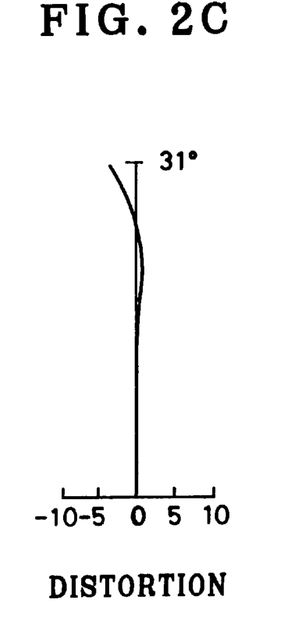

Aberration curves of the first Example are shown in FIGS. 2A, 2B and 2C.

EXAMPLE 2

The finder of the second Example has the same composition as the first Example, and is designed to have a fixed magnification M of 0.346. The above definition (3) on the aspherical surfaces is applicable to any of the following examples.

Numerical values for the second Example will be described below.

EXAMPLE 2

| i | R(mm) | D(mm) | N | ν |
|---|---|---|---|---|
| 1 | 10.13125(aspherical) | 3.380 | 1.492 | 57.50 |
| 2 | −6.93385(aspherical) | 8.593 | | |
| 3 | 11.01268 | 37.795 | 1.492 | 57.50 |
| 4 | −13.12732(aspherical) | | | |

Aspherical coefficients of the second Example are as follows:

| i | 1 | 2 | 4 |
|---|---|---|---|
| K | 0.5617 | −2.2695 | 0.4593 |
| A | 0.86747E-3 | 0.37127E-3 | 0.17668E-3 |
| B | −0.40343E-4 | 0.70903E-4 | −0.80546E-5 |
| C | −0.11337E-4 | −0.24950E-5 | −0.41850E-6 |
| D | 0.25876E-6 | −0.45100E-6 | −0.37005E-9 |

In the second Example, the first and second characteristic values are:

$\{(1-Np)/Re\}-(Np/Tp)=-0.002$; and $\Delta Z-Re\cdot[1-\sqrt{1-(4/Re^2)}]=0.002$.

Therefore the first and second characteristic values satisfy the conditions (1) and (2) respectively.

Figure 3A:
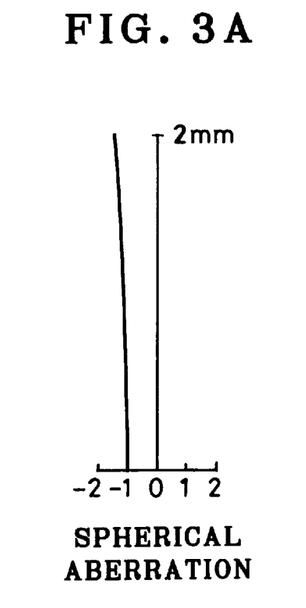
FIGS. 3A, 3B and 3C are diagrams showing aberration curves of a finder according to Example 2 of the present invention.
Figure 3B:
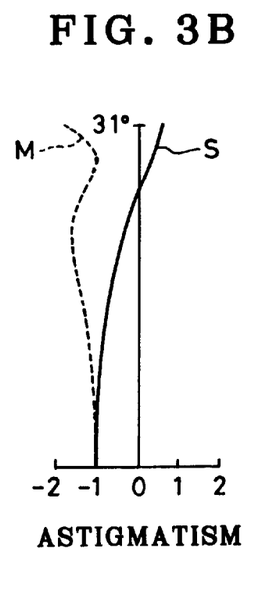
Figure 3C:
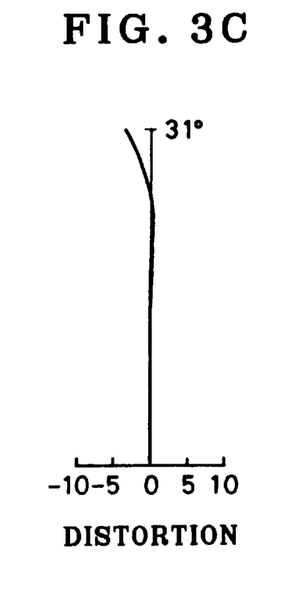

Aberration curves of the second Example are shown in FIGS. 3A, 3B and 3C.

EXAMPLE 3

The finder of the third Example has the same composition as the first Example, and is designed to have a fixed magnification M of 0.363.

Numerical values for the third Example will be described below.

EXAMPLE 3

| i | R(mm) | D(mm) | N | ν |
|---|---|---|---|---|
| 1 | 10.13173(aspherical) | 3.380 | 1.492 | 57.50 |
| 2 | −6.93417(aspherical) | 8.327 | | |
| 3 | 11.01268 | 37.795 | 1.492 | 57.50 |
| 4 | −12.43901(aspherical) | | | |

Aspherical coefficients of the third Example are as follows:

| i | 1 | 2 | 4 |
|---|---|---|---|
| K | 0.5550 | −0.7826 | 0.4534 |
| A | 0.86757E-3 | 0.36427E-3 | 0.30070E-3 |
| B | −0.40631E-4 | 0.70722E-4 | −0.24640E-4 |
| C | −0.11482E-4 | −0.24872E-5 | 0.11418E-5 |
| D | 0.25253E-6 | −0.45000E-6 | −0.71157E-8 |

In the third Example, the first and second characteristic values are:

$\{(1-Np)/Re\}-(Np/Tp)=-0.00163$; and $\Delta Z-Re\cdot[1-\sqrt{1-4/Re^2)}]=0.004$.

Therefore the first and second characteristic values satisfy the conditions (1) and (2) respectively.

Figure 4A:
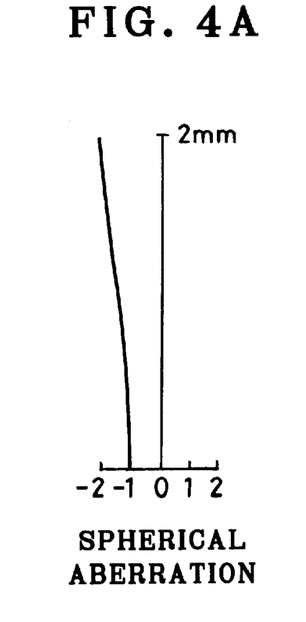
FIGS. 4A, 4B and 4C are diagrams showing aberration curves of a finder according to Example 3 of the present invention.
Figure 4B:
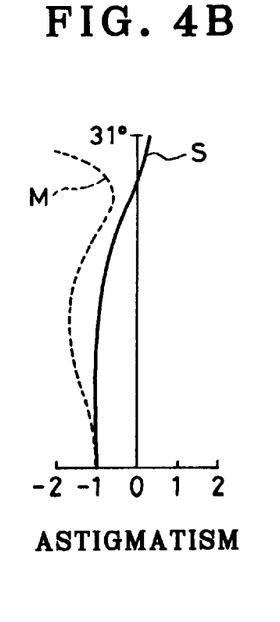
Figure 4C:
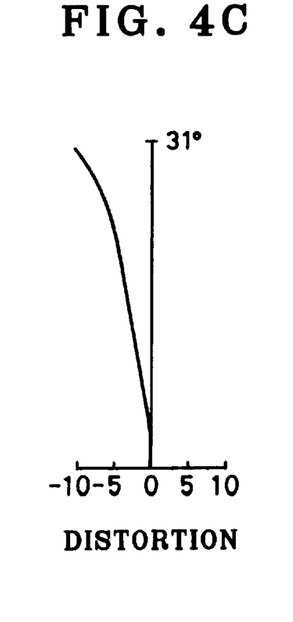

Aberration curves of the third Example are shown in FIGS. 4A, 4B and 4C.

EXAMPLE 4

The finder of the fourth Example has the same composition as the first Example, and is designed to have a fixed magnification M of 0.34.

Numerical values for the fourth Example will be described below.

EXAMPLE 4

| i | R(mm) | D(mm) | N | ν |
|---|---|---|---|---|
| 1 | 15.76854(aspherical) | 3.380 | 1.492 | 57.50 |
| 2 | −5.54264(aspherical) | 8.380 | | |
| 3 | 11.08102 | 37.980 | 1.492 | 57.50 |
| 4 | −12.96510(aspherical) | | | |

Aspherical coefficients of the fourth Example are as follows:

| i | 1 | 2 | 4 |
|---|---|---|---|
| K | −37.2327 | −5.5426 | 2.8109 |
| A | 0.92649E-3 | 0.95024E-4 | 0.16689E-3 |
| B | 0.14037E-3 | 0.82115E-4 | −0.46253E-6 |
| C | −0.19492E-4 | −0.31341E-5 | 0.87889E-6 |
| D | 0.40323E-7 | −0.25470E-6 | −0.28280E-7 |

In the fourth Example, the first and second characteristic values are:

$\{(1-Np)/Re\}-(Np/Tp)=-0.00134$; and $\Delta Z - Re \cdot [1-\sqrt{1-(4/Re^2)}]=0.001$.

Therefore the first and second characteristic values satisfy the conditions (1) and (2) respectively.

Figures 5A, 5B, 5C, 6:
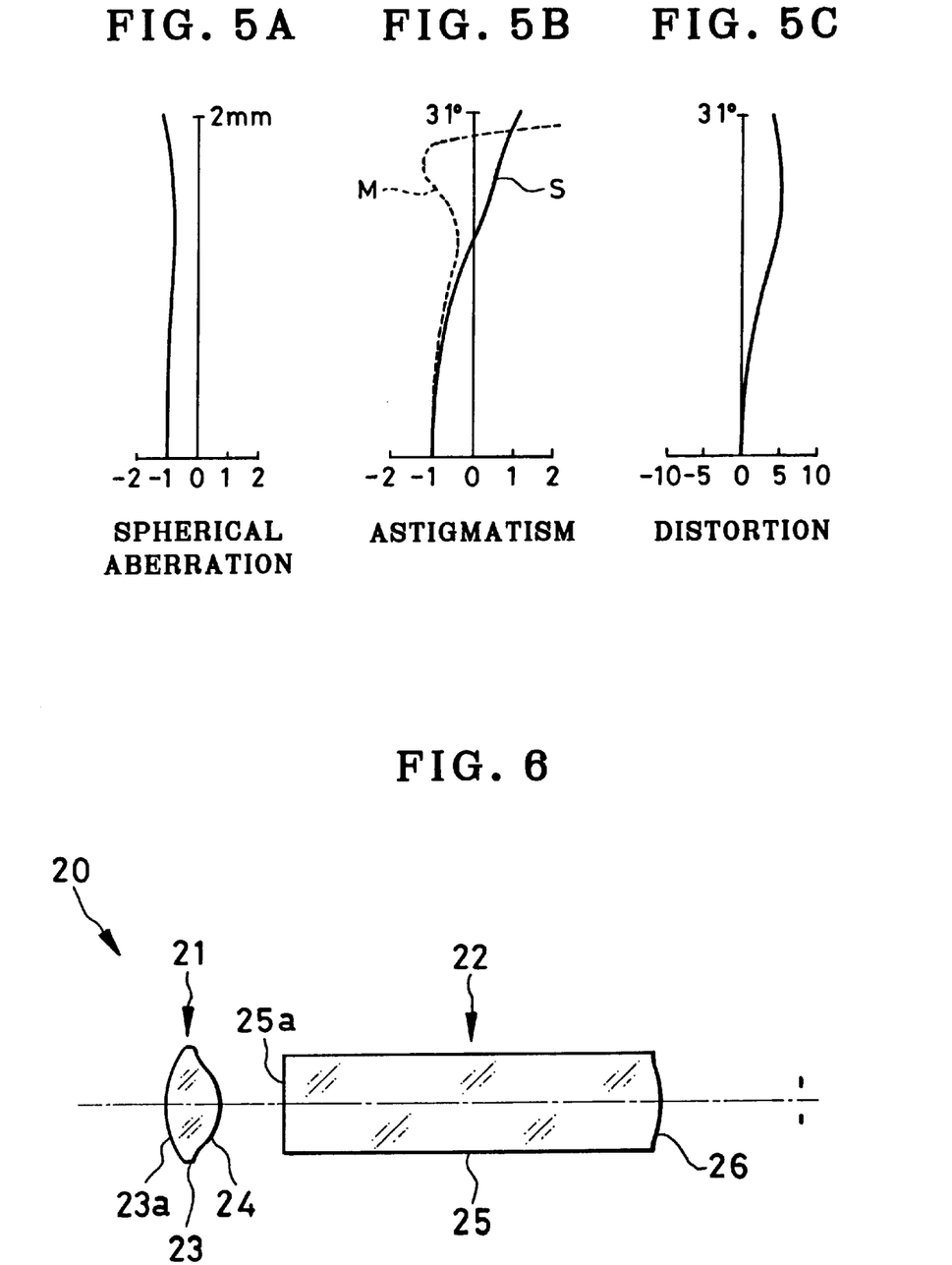
FIGS. 5A, 5B and 5C are diagrams showing aberration curves of a finder according to Example 4 of the present invention.
FIG. 6 is a schematic diagram showing a finder according to Example 5 of the present invention.

Aberration curves of the fourth Example are shown in FIGS. 5A, 5B and 5C.

EXAMPLE 5

In the finder 20 of the fifth Example, as shown in FIG. 6, the objective lens system doubles as a field lens. The finder 20 is composed of an objective lens block 21 having a positive power, and an eyepiece block 22, arranged in this order from the object side. The objective lens block 21 consists of a field lens and an objective lens 23 as an integral part, wherein a field lens surface 24 is formed on the image side of the objective lens 23. The objective lens 23 is a convex lens whose object side surface 23a and the field lens surface 24 on the image side are aspherical. The eyepiece block 22 consists of an erect image prism 25 and an eyepiece as an integral part, wherein an eyepiece surface 26 is formed on the image side of the erect image prism 25. The eyepiece surface 26 is aspherical and has a positive power. The object side surface 25a of the erect image prism 25 is flat, so that it is easy to imprint a parallax correction mark or a target mark for autofocusing onto the flat object side surface 25a. The finder 20 is designed to have a fixed magnification M of 0.3.

Numerical values for the fifth Example will be described below.

EXAMPLE 5

| i | R(mm) | D(mm) | N | ν |
|---|---|---|---|---|
| 1 | 13.02454(aspherical) | 6.212 | 1.492 | 57.50 |
| 2 | −5.92918(aspherical) | 7.824 | | |
| 3 | ∞ | 45.391 | 1.492 | 57.50 |
| 4 | −15.44612(aspherical) | | | |

Aspherical coefficients of the fifth Example are as follows:

| i | 1 | 2 | 4 |
|---|---|---|---|
| K | −0.9531 | −2.2538 | 2.5855 |
| A | −0.47644E-4 | −0.53395E-4 | 0.98583E-4 |
| B | 0.35181E-6 | 0.10298E-5 | 0.41919E-5 |
| C | 0.96416E-9 | −0.14304E-7 | −0.22895E-6 |
| D | 0.21701E-9 | 0.47181E-9 | 0.11119E-7 |

In the fifth Example, the first and second characteristic values are:

$\{(1-Np)/Re\}-(Np/Tp)=-0.00102$; and $\Delta Z - Re \cdot [1-\sqrt{1-(4/Re^2)}]=0.00034$.

Therefore the first and second characteristic values satisfy the conditions (1) and (2) respectively.

Figure 7A:
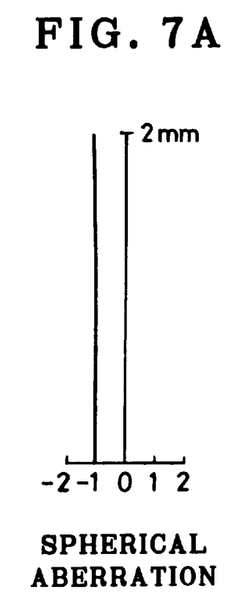
FIGS. 7A, 7B and 7C are diagrams showing aberration curves of the finder according to Example 5.
Figure 7B:
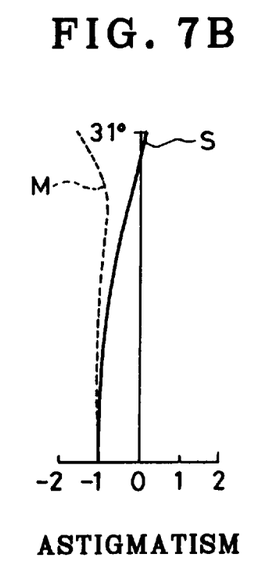
Figure 7C:
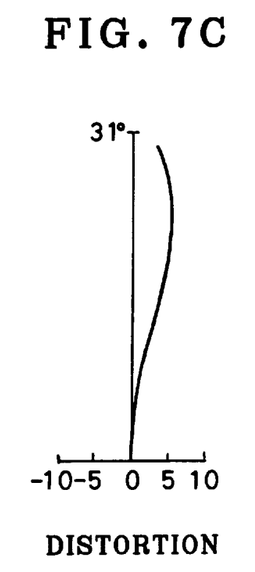

Aberration curves of the fifth Example are shown in FIGS. 7A, 7B and 7C.

EXAMPLE 6

The finder of the sixth Example has the same composition as the fifth Example, and is designed to have a fixed magnification M of 0.36.

Numerical values for the sixth Example will be described below.

| i | R(mm) | D(mm) | N | ν |
|---|---|---|---|---|
| 1 | 12.67552(aspherical) | 6.393 | 1.492 | 57.50 |
| 2 | −7.39001(aspherical) | 8.839 | | |
| 3 | ∞ | 43.193 | 1.492 | 57.50 |
| 4 | −14.67562(aspherical) | | | |

Aspherical coefficients of the sixth Example are as follows:

| i | 1 | 2 | 4 |
|---|---|---|---|
| K | −1.0260 | −2.4350 | 2.4229 |
| A | −0.40790E-4 | −0.40676E-4 | 0.12733E-3 |
| B | 0.16701E-6 | 0.10769E-5 | 0.42528E-5 |
| C | −0.21512E-8 | −0.25351E-7 | −0.16269E-6 |
| D | 0.95942E-10 | 0.31566E-9 | 0.47546E-8 |

In the sixth Example, the first and second characteristic values are:

$\{(1-Np)/Re\}-(Np/Tp)=-0.00102$; and $\Delta Z - Re \cdot [1-\sqrt{1-(4/Re^2)}]=0.00067$.

Therefore the first and second characteristic values satisfy the conditions (1) and (2) respectively.

Figure 8A:
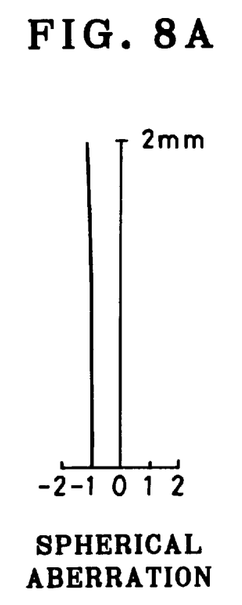
FIGS. 8A, 8B and 8C are diagrams showing aberration curves of the finder according to Example 6.
Figure 8B:
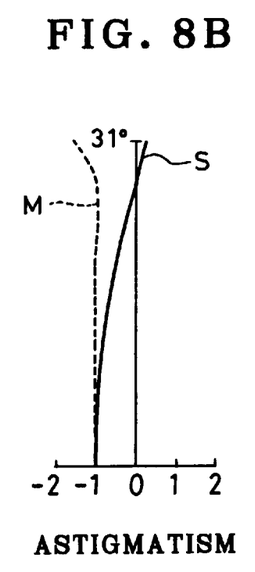
Figure 8C:
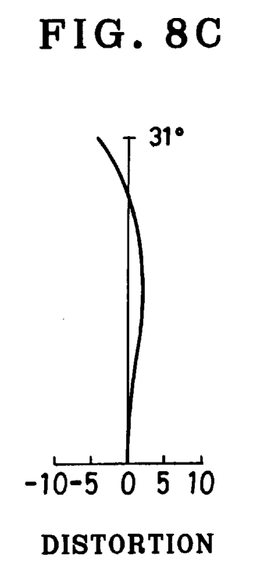

Aberration curves of the sixth Example are shown in FIGS. 8A, 8B and 8C.

EXAMPLE 7

Figure 9:
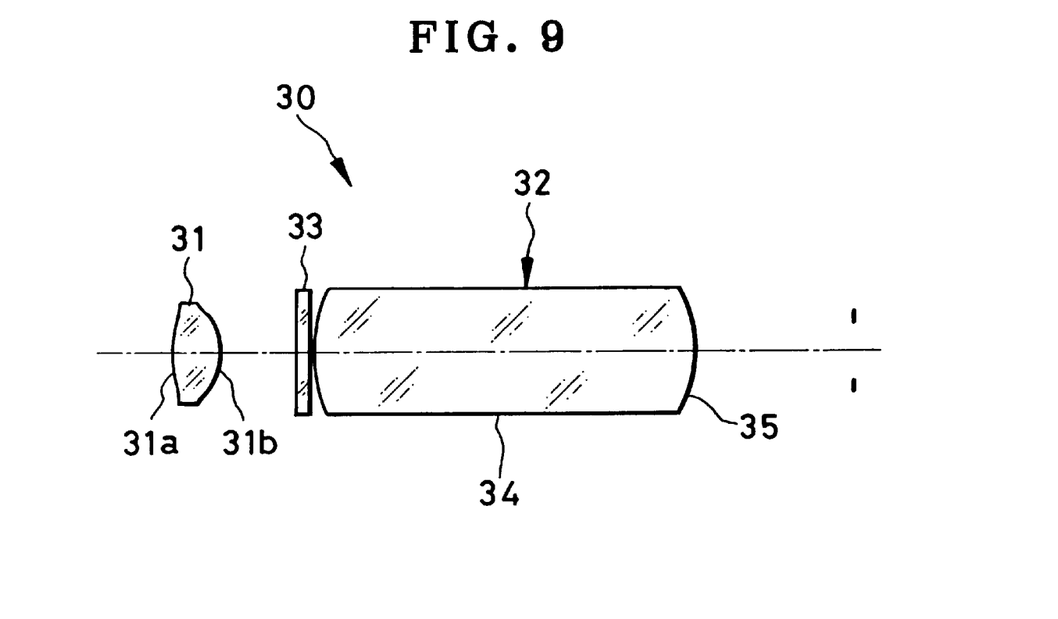
FIG. 9 is a schematic diagram showing a finder according to Example 7 of the present invention.

The finder 30 of the seventh Example, as shown in FIG. 9, is composed of an objective lens 31 having a positive power, and an eyepiece block 32, arranged in this order from the object side. A plane-parallel plate 33 is placed on the object side of the eyepiece block 32. A parallax correction mark, a target mark for autofocusing or the like is imprinted on the plane-parallel plate 33. The objective lens 31 is a convex lens whose surfaces 31a and 31b are both aspherical. The eyepiece block 32 consists of an erect image prism 34 and an eyepiece as an integral part, wherein an eyepiece surface 35 is formed on the image side of the erect image prism 34. The eyepiece surface 35 is aspherical and has a positive power. In this finder 30, the image plane of the objective lens 31 is set away from the erect image prism 34 of the eyepiece block 32. The finder 30 is designed to have a fixed magnification M of 0.389.

Separating the image plane of the objective lens 31 from the erect image prism 34 prevents the gain of the erect image prism 34 from lowering because of stains and scratches on the optical system. As the plane-parallel plate is generally cheaper than the prism, the finder 30 of the seventh Example is useful for cutting cost.

Numerical values for the seventh Example will be described below.

EXAMPLE 7

| i | R(mm) | D(mm) | N | ν |
|---|---|---|---|---|
| 1 | 9.82963(aspherical) | 4.652 | 1.492 | 57.50 |
| 2 | −9.15623(aspherical) | 8.176 | | |
| 3 | ∞ | 1.000 | 1.492 | 57.50 |
| 4 | ∞ | 0.500 | | |
| 5 | 16.97681 | 39.405 | 1.492 | 57.50 |
| 6 | −13.61700(aspherical) | | | |

Aspherical coefficients of the fifth Example are as follows:

| i | 1 | 2 | 4 |
|---|---|---|---|
| K | −1.8735 | −1.0396 | −1.6867 |
| A | −0.60547E-3 | −0.31502E-3 | 0.64018E-5 |
| B | −0.17789E-3 | −0.85439E-4 | −0.95227E-6 |
| C | 0.10911E-4 | 0.24274E-5 | −0.10964E-6 |
| D | 0.10911E-4 | −0.98164E-8 | 0.28866E-8 |

In the seventh Example, the first and second characteristic values are:

$$\{(1-Np)/Re\}-(Np/Tp)=-0.00173; \text{ and}$$

$$\Delta Z-Re\cdot[1-\sqrt{1-(4/Re^2)}]=0.00136.$$

Therefore the first and second characteristic values satisfy the conditions (1) and (2) respectively.

Figure 10A:
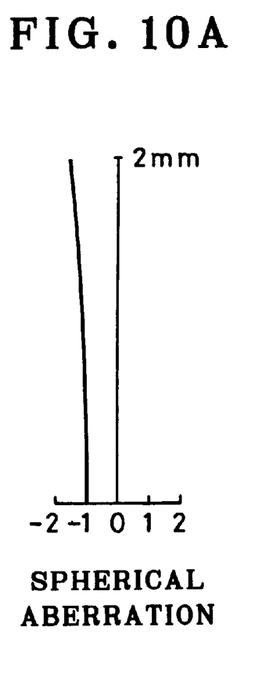
FIGS. 10A, 10B and 10C are diagrams showing aberration curves of the finder according to Example 7.
Figure 10B:
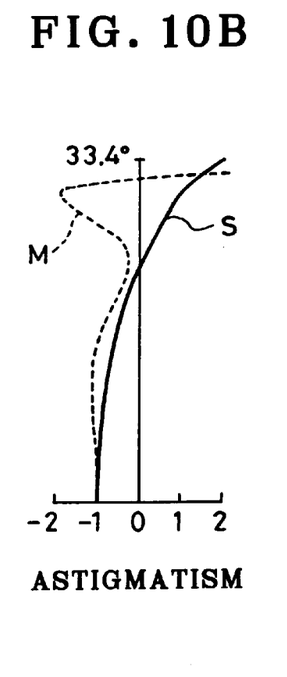
Figure 10C:
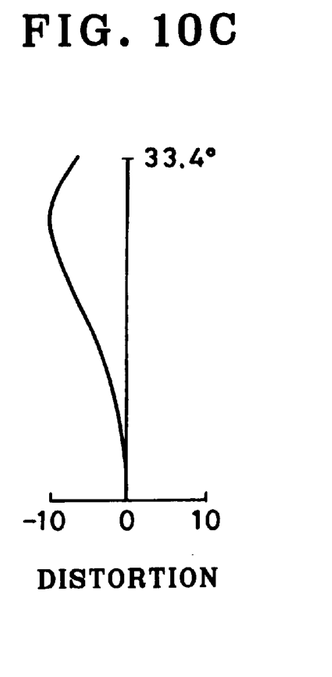

Aberration curves of the seventh Example are shown in FIGS. 10A, 10B and 10C.

EXAMPLE 8

Figure 11:
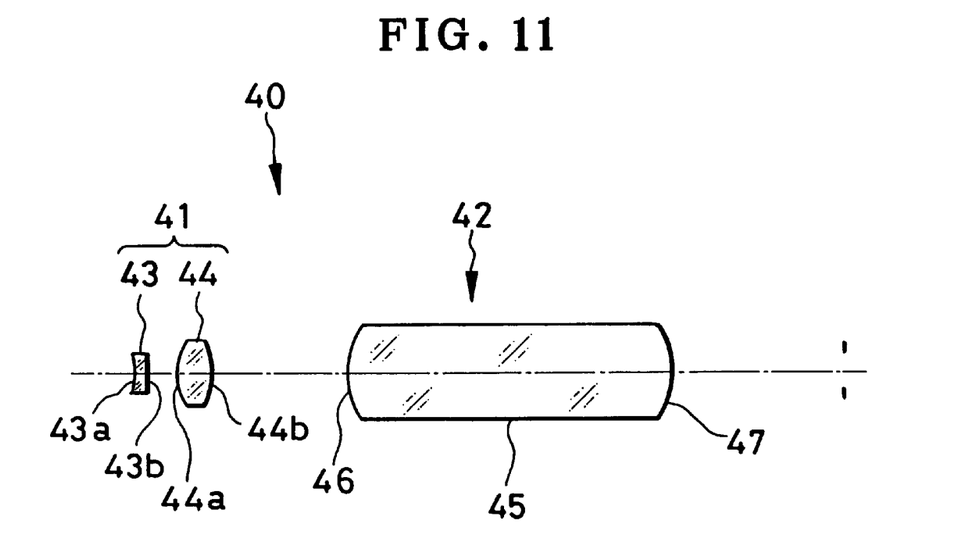
FIG. 11 is a schematic diagram showing a zoom finder according to Example 8 of the present invention.

The zoom finder 40 of the eighth Example of the present invention, as shown in FIG. 11, is composed of an objective lens group 41 with a positive power as a whole, and an eyepiece block 42, arranged in this order from the object side. The objective lens group 41 consists of a first lens 43 with a negative power and a second lens 44 with a positive power, arranged in this order from the object side. The first and second lenses 43 and 44 respectively have aspherical object side surfaces 43a and 44a and aspherical image side surfaces 43b and 44b. The eyepiece block 42 consists of an erect image prism 45, a field lens and an eyepiece lens which are formed as an integral part by forming a field lens surface 46 and an eyepiece lens surface 47 on the object side and the image side of the erect image prism 45 respectively. The eyepiece lens surface 47 has a positive power and is aspherical. The magnification M of the finder 40 is variable in a range from 0.346 to 0.623 by moving the second lens 44 along the optical axis. Variations in diopter that may be resulted from the zooming can be corrected by slightly moving the first lens 43 during the zooming.

Numerical values for the eighth Example will be described below.

EXAMPLE 8

| i | R(mm) | D(mm) | N | ν |
|---|---|---|---|---|
| 1 | −7.67287(aspherical) | 1.180 | 1.492 | 57.50 |
| 2 | 16.60889(aspherical) | variable | | |
| 3 | 6.70652(aspherical) | 1.000 | 1.492 | 57.50 |
| 4 | −6.93385(aspherical) | variable | | |
| 5 | 10.03707 | 32.260 | 1.492 | 57.50 |
| 6 | −10.87728(aspherical) | | | |

Aspherical coefficients of the eighth Example are as follows:

| i | 1 | 2 | 3 | 4 | 6 |
|---|---|---|---|---|---|
| K | −12.5198 | −47.9095 | 0.3479 | −2.41680 | −0.78457 |
| A | −0.10009E-2 | 0.15129E-2 | −0.23467E-3 | 0.54095E-3 | 0.83729E-4 |
| B | −0.18576E-3 | 0.12394E-4 | 0.12492E-4 | 0.32099E-4 | −0.22109E-6 |
| C | 0.10097E-3 | 0.60535E-4 | −0.88080E-6 | 0.76186E-7 | −0.93781E-7 |
| D | −0.27671E-4 | −0.25255E-4 | −0.17212E-6 | 0.29449E-8 | −0.18090E-8 |

As the magnification M changes from 0.346 to 0.623, the spacing D2 between the first lens 43 and the second lens 44, and the spacing D4 between the second lens 44 and the eyepiece block 42 change as follows:

D2: 5.7154 to 1.0853

D4: 11.7591 to 16.1357

In the eighth Example, the first and second characteristic values are:

$$\{(1-Np)/Re\}-(Np/Tp)=-0.00102; \text{ and}$$

$$\Delta Z-Re\cdot[1-\sqrt{1-(4/Re^2)}]=0.00254.$$

Therefore the first and second characteristic values satisfy the conditions (1) and (2) respectively.

The relationship between the focal length f1 of the first lens 43 and the focal length f2 of the second lens 44 is as follows:

$$f1/f2=-1.39138$$

Figure 12A:
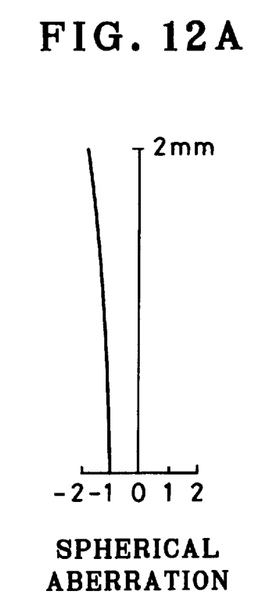
FIGS. 12A, 12B and 12C are diagrams showing aberration curves of the zoom finder according to Example 8, in a wide-angle terminal.
Figure 12B:
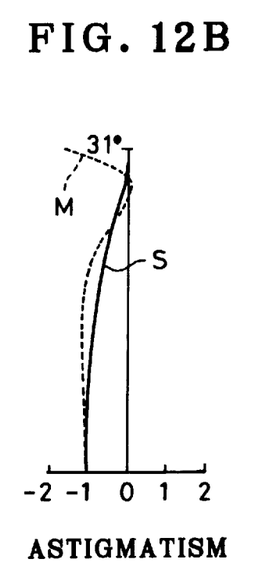
Figure 12C:
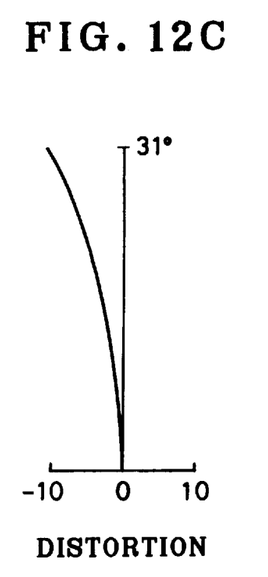
Figure 13A:
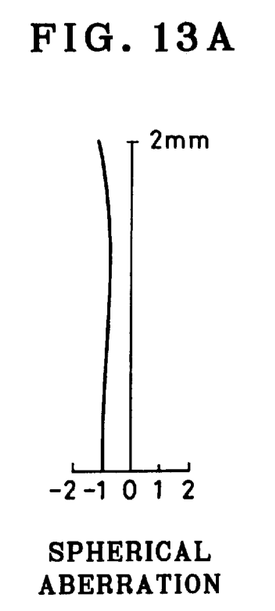
FIGS. 13A, 13B and 13C are diagrams showing aberration curves of the zoom finder according to Example 8, in a telephoto terminal.
Figure 13B:
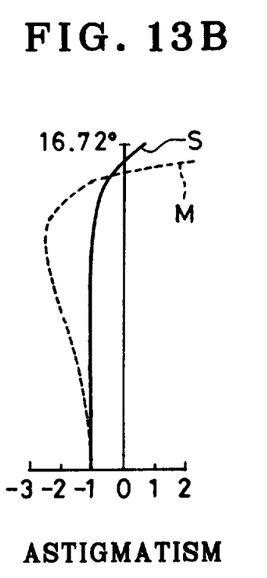
Figure 13C:
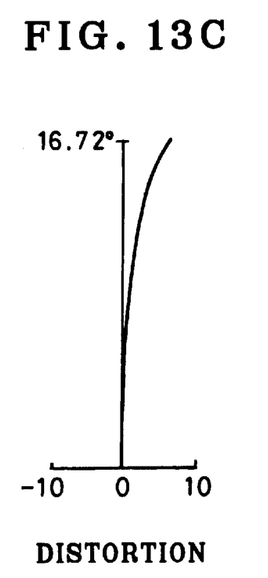

Aberration curves of the eighth Example in the wide-angle terminal, i.e. where M=0.346, are shown in FIGS. 12A, 12B and 12C, whereas those in the telephoto terminal, i.e. where M=0.623, are shown in FIGS. 13A, 13B and 13C.

EXAMPLE 9

The zoom finder of the ninth Example of the present invention has the same composition as the eight Example. The magnification M of the ninth Example is variable in a range from 0.373 to 0.671.

Numerical values for the ninth Example will be described below.

EXAMPLE 9

| i | R(mm) | D(mm) | N | ν |
|---|---|---|---|---|
| 1 | −7.67287(aspherical) | 1.180 | 1.492 | 57.50 |
| 2 | 16.60889(aspherical) | variable | | |
| 3 | 6.70652(aspherical) | 3.380 | 1.492 | 57.50 |
| 4 | −6.93385(aspherical) | variable | | |
| 5 | 10.63322 | 29.896 | 1.492 | 57.50 |
| 6 | −10.26975(aspherical) | | | |

Aspherical coefficients of the ninth Example are as follows:

| i | 1 | 2 | 3 | 4 | 6 |
|---|---|---|---|---|---|
| K | −12.5198 | −47.9095 | 0.3479 | −2.41680 | −0.10945 |
| A | −0.10009E-2 | 0.15129E-2 | −0.23467E-3 | 0.54095E-3 | 0.19764E-3 |
| B | −0.18576E-3 | 0.12394E-4 | 0.12492E-4 | 0.32099E-4 | −0.57061E-5 |
| C | 0.10097E-3 | 0.60535E-4 | −0.88080E-6 | 0.76186E-7 | −0.25055E-6 |
| D | −0.27671E-4 | −0.25255E-4 | −0.17212E-6 | 0.29449E-8 | −0.45828E-8 |

As the magnification M changes from 0.373 to 0.671, the spacing D2 between the first lens 43 and the second lens 44, and the spacing D4 between the second lens 44 and the eyepiece block 42 change as follows:

D2: 5.7154 to 1.0853

D4: 11.7591 to 16.1357

In the ninth Example, the first and second characteristic values are:

$$\{(1-Np)/Re\}-(Np/Tp)=-0.002; \text{ and}$$

$$\Delta Z - Re \cdot [1-\sqrt{\{1-(4/Re^2)\}}]=0.00307.$$

Therefore the first and second characteristic values satisfy the conditions (1) and (2) respectively.

The relationship between the focal length f1 of the first lens 43 and the focal length f2 of the second lens 44 is:

$$f1/f2=-1.39138$$

Figure 14A:
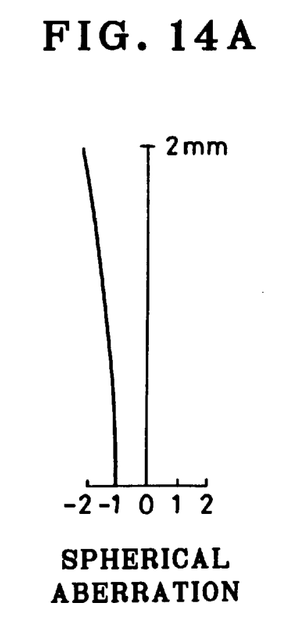
FIGS. 14A, 14B and 14C are diagrams showing aberration curves of a zoom finder according to Example 9, in a wide-angle terminal.
Figure 14B:
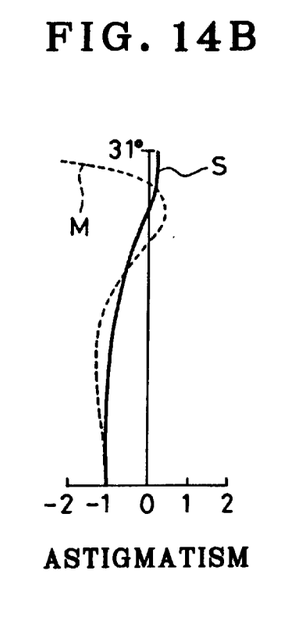
Figure 14C:
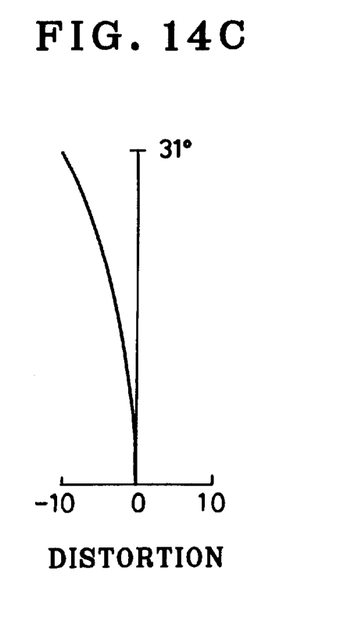
Figure 15A:
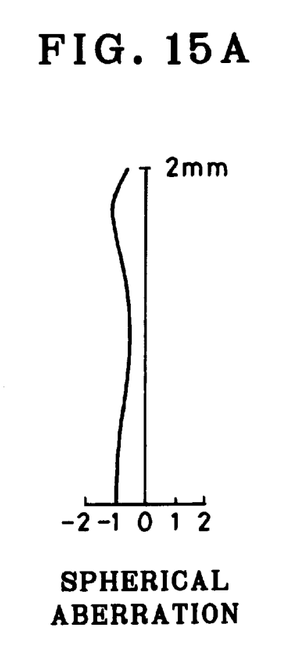
FIGS. 15A, 15B and 15C are diagrams showing aberration curves of the zoom finder according to Example 9, in a telephoto terminal.
Figure 15B:
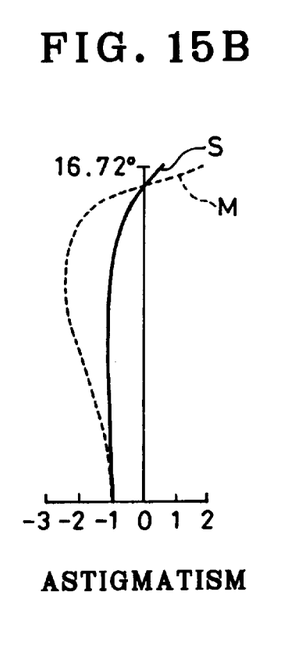
Figure 15C:
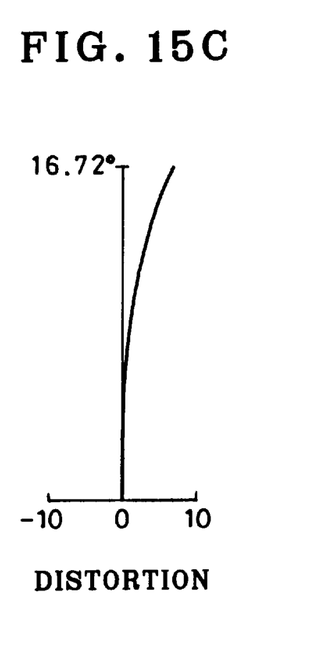

Aberration curves of the ninth Example in the wide-angle terminal, i.e. where M=0.373, are shown in FIGS. 14A, 14B and 14C, whereas those in the telephoto terminal, i.e. where M=0.671, are shown in FIGS. 15A, 15B and 15C.

EXAMPLE 10

The zoom finder of the tenth Example of the present invention has the same composition as the eight Example. The magnification M of the tenth Example is variable in a range from 0.393 to 0.703.

Numerical values for the tenth Example will be described below.

EXAMPLE 10

| i | R(mm) | D(mm) | N | ν |
|---|---|---|---|---|
| 1 | −8.65562(aspherical) | 1.191 | 1.492 | 57.50 |
| 2 | 15.50348(aspherical) | variable | | |
| 3 | 8.20737(aspherical) | 2.785 | 1.492 | 57.50 |
| 4 | −6.34761(aspherical) | variable | | |
| 5 | 10.68499 | 29.896 | 1.492 | 57.50 |
| 6 | −10.87797(aspherical) | | | |

Aspherical coefficients of the tenth Example are as follows:

| i | 1 | 2 | 3 | 4 | 6 |
|---|---|---|---|---|---|
| K | −1.7661 | 12.0300 | 0.6419 | −0.16016 | −0.65308 |
| A | 0.86805E-3 | 0.10309E-2 | −0.13066E-3 | 0.56238E-3 | 0.79978E-4 |
| B | −0.55731E-4 | −0.25303E-3 | 0.12017E-4 | 0.64503E-4 | 0.76040E-6 |
| C | 0.60987E-5 | 0.18518E-4 | −0.70653E-5 | −0.37429E-6 | 0.12438E-7 |
| D | −0.46744E-4 | −0.25689E-4 | −0.67237E-6 | 0.14459E-7 | −0.11388E-8 |

As the magnification M changes from 0.393 to 0.703, the spacing D2 between the first lens 43 and the second lens 44, and the spacing D4 between the second lens 44 and the eyepiece block 42 change as follows:

D2: 5.0259 to 0.6132

D4: 12.9294 to 17.6946

In the tenth Example, the first and second characteristic values are:

$$\{(1-Np)/Re\}-(Np/Tp)=-0.00102; \text{ and}$$

$$\Delta Z - Re \cdot [1-\sqrt{\{1-(4/Re^2)\}}]=0.00237.$$

Therefore the first and second characteristic values satisfy the conditions (1) and (2) respectively.

The relationship between the focal length f1 of the first lens 43 and the focal length f2 of the second lens 44 is:

$$f1/f2=-1.43066$$

Figures 16A, 16B:
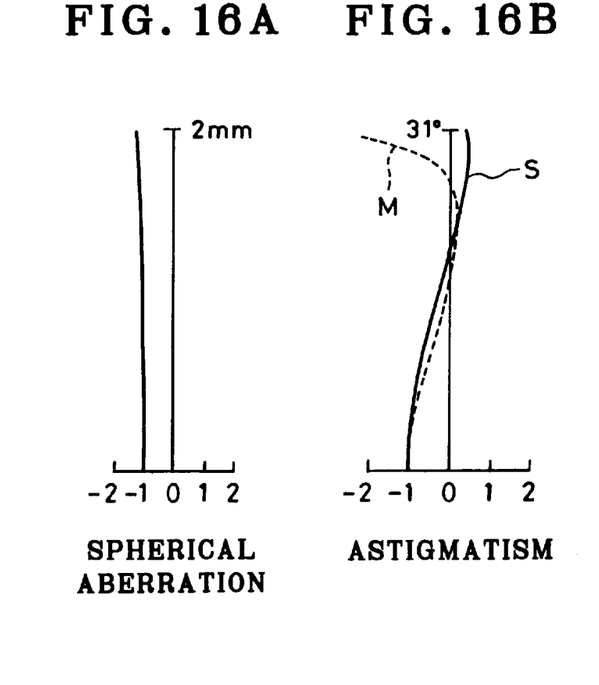
FIGS. 16A, 16B and 16C are diagrams showing aberration curves of a zoom finder according to Example 10, in a wide-angle terminal.
Figure 16C:
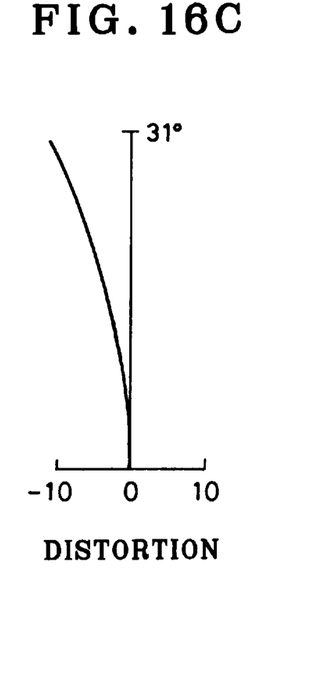
Figures 17A, 17B:
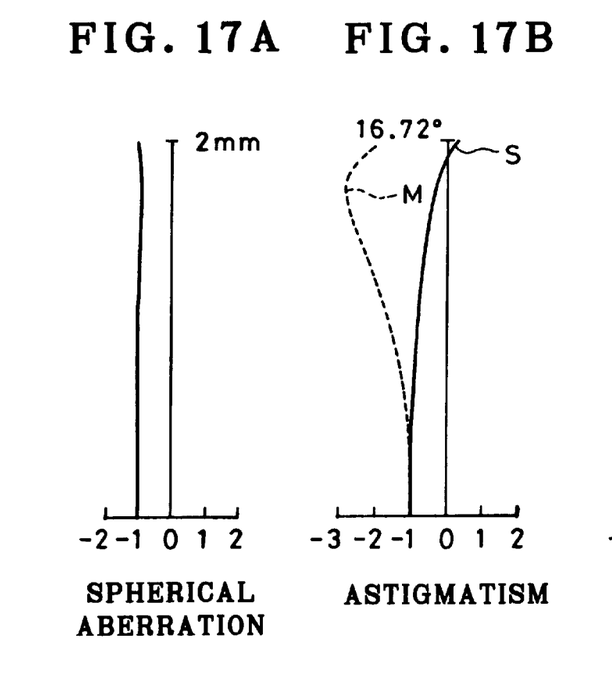
FIGS. 17A, 17B and 17C are diagrams showing aberration curves of the zoom finder according to Example 10, in a telephoto terminal.
Figure 17C:
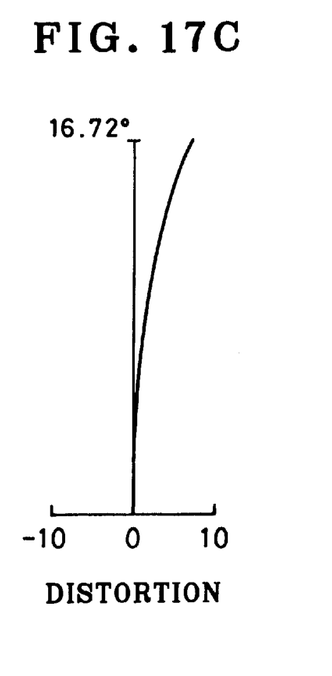

Aberration curves of the ninth example in the wide-angle terminal, i.e. where M=0.393, are shown in FIGS. 16A, 16B and 16C, whereas those in the telephoto terminal, i.e. where M=0.703, are shown in FIGS. 17A, 17B and 17C.

What is claimed is:

1. A real image finder comprising:
   an objective lens system including a convex lens and having a positive power as a whole;
   an erect image prism having four reflection surfaces and inverting an inverted image of an object formed through the objective lens system in horizontal and vertical directions; and
   an eyepiece having a positive power, wherein the erect image prism and the eyepiece are integrated by forming an eyepiece surface on an image side of the erect image prism;

the real image finder satisfying the following condition:

$$-0.01<\{(1-N_p)/R_e\}-(N_p/T_p)<0 \tag{1}$$

wherein Re is the paraxial radius of curvature of the eyepiece surface, Np is the refractive index of the erect image prism, and Tp is the axial thickness of the erect image prism.

2. A real image finder as claimed in claim 1, wherein a field lens, for conducting an image of an object formed through the objective lens system to the eyepiece, is formed integrally on an object side surface of the erect image prism.

3. A real image finder comprising:

an objective lens system including a convex lens and having a positive power as a whole;

an erect image prism having four reflection surfaces and inverting an inverted image of an object formed through the objective lens system in horizontal and vertical directions; and an eyepiece having a positive power, wherein the erect image prism and the eyepiece are integrated by forming an eyepiece surface on an image side of the erect image prism;

the real image finder satisfying the following condition:

$$0<\Delta Z - R_e \cdot [1-\sqrt{1-(4/R_e^2)}]<0.01 \tag{2}$$

wherein Re is the paraxial radius of curvature of the eyepiece surface, and ΔZ is the sag value at the height of 2 mm from an optical axis of the real image finder.

4. A real image finder as claimed in claim 3, wherein a field lens, for conducting an image of an object formed through the objective lens system to the eyepiece, is formed integrally on an object side surface of the erect image prism.

* * * * *